(12) United States Patent
Sar et al.

(10) Patent No.: US 11,016,872 B1
(45) Date of Patent: May 25, 2021

(54) DETERMINING A USER HABIT

(71) Applicant: Google LLC, Mountain View, CA (US)

(72) Inventors: Erwin Can Sar, Mountain View, CA (US); Timothy Youngjin Sohn, Mountain View, CA (US); Andrew Tomkins, Menlo Park, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/548,294

(22) Filed: Aug. 22, 2019

Related U.S. Application Data

(63) Continuation of application No. 15/675,415, filed on Aug. 11, 2017, now Pat. No. 10,394,684, which is a continuation of application No. 14/144,966, filed on Dec. 31, 2013, now Pat. No. 9,766,998.

(51) Int. Cl.
*G06F 11/34* (2006.01)

(52) U.S. Cl.
CPC .............................. *G06F 11/3476* (2013.01)

(58) Field of Classification Search
CPC .................................................. G06F 11/3476
See application file for complete search history.

(56) References Cited

U.S. PATENT DOCUMENTS

| | | | |
|---|---|---|---|
| 5,603,054 A | 2/1997 | Theimer et al. | |
| 6,842,877 B2 | 1/2005 | Robarts et al. | |
| 7,496,500 B2 | 2/2009 | Reed et al. | |
| 8,055,707 B2 | 11/2011 | Desai et al. | |
| 8,108,206 B2 | 1/2012 | Hufnagel et al. | |
| 8,364,467 B1 | 1/2013 | Bowman et al. | |
| 8,375,099 B2 | 2/2013 | Carroll et al. | |
| 8,417,650 B2 | 4/2013 | Graepel et al. | |
| 8,521,818 B2 | 8/2013 | McGann et al. | |
| 8,560,487 B2 | 10/2013 | Jhoney et al. | |
| 8,566,152 B1 | 10/2013 | Shaw et al. | |
| 8,599,801 B2 | 12/2013 | Baio et al. | |
| 8,756,172 B1 | 6/2014 | Radovanovic et al. | |
| 9,628,576 B1 | 4/2017 | Agarwal et al. | |
| 2006/0168259 A1 | 7/2006 | Spilotro et al. | |
| 2009/0119261 A1 | 5/2009 | Ismalon | |
| 2009/0307212 A1 | 12/2009 | Ramot et al. | |
| 2010/0223212 A1 | 9/2010 | Manolescu et al. | |
| 2011/0289015 A1 | 11/2011 | Mei | |
| 2012/0150532 A1 | 6/2012 | Mirowski et al. | |
| 2012/0239761 A1 | 9/2012 | Linner et al. | |
| 2012/0259851 A1 | 10/2012 | Jia et al. | |
| 2012/0296909 A1 | 11/2012 | Cao et al. | |
| 2012/0317499 A1 | 12/2012 | Shen | |

(Continued)

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages; Jul. 1, 2004.

(Continued)

*Primary Examiner* — Roy Y Yi
*Assistant Examiner* — Geoffrey T Evans
(74) *Attorney, Agent, or Firm* — Middleton Reutlinger

(57) ABSTRACT

Methods and apparatus related to determining one or more user habits for a user. A group of one or more past user activity occurrences of a user may be determined based on similarity between the past user activity occurrences of the group. A user habit may be determined based on the past user activity occurrences of the group.

11 Claims, 7 Drawing Sheets

(56) References Cited

U.S. PATENT DOCUMENTS

| | | |
|---|---|---|
| 2012/0331036 A1 | 12/2012 | Duan et al. |
| 2013/0073662 A1 | 3/2013 | Meunier et al. |
| 2013/0159270 A1 | 6/2013 | Urmy et al. |
| 2013/0297551 A1 | 11/2013 | Smith et al. |
| 2014/0200739 A1 | 7/2014 | Kirsch |
| 2014/0304019 A1 | 10/2014 | Scott |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87; Jan. 1, 2011.

| Past Activity Occurrence | User Actions | Interaction Entities | Trigger Indicators |
|---|---|---|---|
| 122A | "Fix" 1222A | "Faucet" 1224A | "Saturday" 1226A1<br>"DIY Website A" 1226A2<br>"Search A" 1226A3 |
| 122B | "Repair" 1222B | "Door" 1224B | "Sunday" 1226B1<br>"DIY Website B" 1226B2<br>"Search B" 1226B3 |
| 122C | "Change" 1222C | "Filters" 1224C | "Saturday" 1226C1 |
| 122D | "Call" 1222D | "Business 1" 1224D | "Saturday" 1226D1<br>"Navigational Search" 1226D2 |
| 122E | "Attend" 1222E | "Event 1" 1224E | "Sunday" 1226E1<br>"Locational Query" 1226E2 |

FIG. 2A

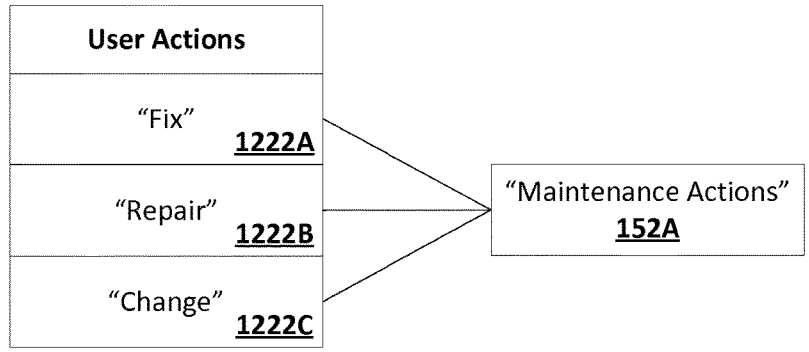

FIG. 2B

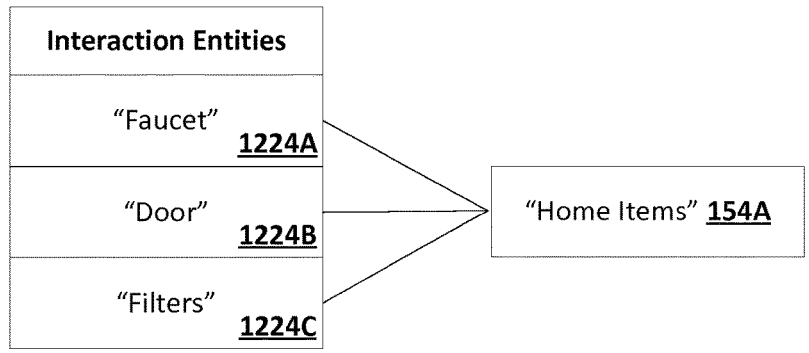

FIG. 2C

| User Habit | Habit Actions | Habit Interaction Entities | Habit Trigger Indicators |
|---|---|---|---|
| 124A | "Maintenance Actions" 1242A | "Home Items" 1244A | "Weekend" 1246A1 "DIY Website" 1246A2 |

| Past Activity Occurrence | User Actions | Interaction Entities | Trigger Indicators |
|---|---|---|---|
| 122F | "Call" 1222F | "Business 1" 1224F | "Pairing With Vehicle" 1226F1<br>"Monday" 1226F2<br>"5:00" 1226F3 |
| 122G | "Call" 1222G | "Mom" 1224G | "Pairing With Vehicle" 1226G1<br>"Saturday" 1226G2<br>"5:30" 1226G3 |
| 122H | "Call" 1222H | "Brother" 1224H | "Pairing With Vehicle" 1226H1<br>"Thursday" 1226H2<br>"5:15" 1226H3 |
| 122I | "Call" 1222I | "Aunt" 1224I | "Pairing With Vehicle" 1226I1<br>"Monday" 1226I2<br>"6:00" 1226I3 |
| 122J | "Call" 1222J | "John" 1224J | "Pairing With Vehicle" 1226J1<br>"Wednesday" 1226J2<br>"5:15" 1226J3 |

FIG. 3A

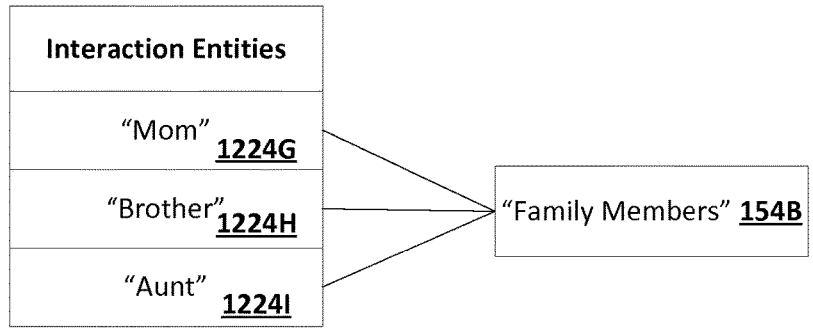

FIG. 3B

FIG. 3C

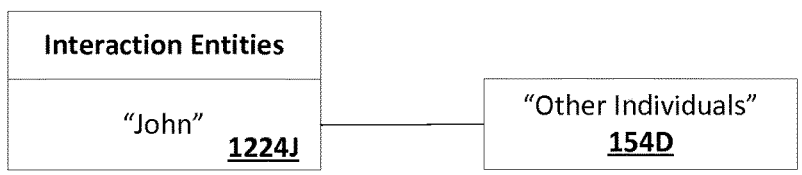

FIG. 3D

| User Habit | Habit Action | Habit Interaction Entities | Habit Trigger Indicators |
|---|---|---|---|
| 124B | "Call" 1242B | <Family Members, 0.6> 1244B1 | <Pairing With Vehicle, required> 1246B1 |
| | | <Businesses, 0.2> 1244B2 | <Weekday, 0.8> 1246B2 |
| | | <Other Individuals, 0.2> 1244B3 | <5:00-6:00, Required> 1246B3 |

FIG. 3E

Identify a plurality of past activity occurrences of a user  400

Determine a group of the past activity occurrences  405

Determine one or more habit user actions, one or more habit interaction entities, and one or more habit trigger indicators based on the group  410

Associate a habit with the user that includes the one or more habit user actions, one or more habit interaction entities, and one or more habit trigger indicators  415

FIG. 4

DETERMINING A USER HABIT

BACKGROUND

A user may have one or more tasks that the user habitually performs. For example, a user may habitually call one or more family members on a drive home from work.

SUMMARY

This specification is directed to methods and apparatus related to determining one or more user habits for a user. For example, a group of one or more past user activity occurrences of a user may be determined based on similarity between the past user activity occurrences of the group. A user habit may be determined based on the past user activity occurrences of the group.

As one example, the past user activity occurrences of the group may each include at least one action associated with the occurrence, at least one interaction entity interacted with during the at least one action, and at least one trigger indicator related to the occurrence. One or more habit actions of the user habit may be determined based on the user actions of the group, one or more habit interaction entities of the user habit may be determined based on the interaction entities of the group, and one or more habit trigger indicators may be determined based on the trigger indicators of the group. In some implementations, one or more of the habit action, the habit interaction entities, and the habit trigger indicators may be based on one or more collections that encompass a plurality of the respective actions, interaction entities, and trigger indicators of the past user activity occurrences of the group (and, optionally, additional information items). For example, a habit action may be a collection of actions "contact" that encompasses user actions of "call" and "email" of past user activity occurrences of the group and additional user actions such as "text". Also, for example, a habit interaction entity may be a collection of interaction entities "family members" that encompasses interaction entities of "mom", "brother", and "aunt" of past user activity occurrences of the group and additional interaction entities such as "sister". Also, for example, a habit trigger indicator may be a collection of trigger indicators such as "Weekday" that encompasses trigger indicators of "Monday", "Wednesday", and "Thursday" of past user activity occurrences of the group and additional trigger indicators such as "Friday".

In some implementations, a method is provided that includes the steps of: identifying a plurality of past activity occurrences of a user, each of the past activity occurrences including an interaction indicator and one or more trigger indicators, and the interaction indicator for each of the past activity occurrences including at least one of: one or more user actions; and one or more interaction entities interacted with during the user actions; determining a group of the past activity occurrences of the user, the group including multiple of the past activity occurrences and determined based on an interaction similarity between the interaction indicators of the past activity occurrences of the group; determining one or more habit user actions based on the user actions of the group; determining one or more habit interaction entities based on the interaction entities of the group; determining habit trigger indicators based on the trigger indicators of the group; and associating a user habit with the user, the user habit including the habit user actions, the habit interaction entities, and the habit trigger indicators.

This method and other implementations of technology disclosed herein may each optionally include one or more of the following features.

The trigger indicators for the past activity occurrences may include one or more temporal indicators associated with the past activity occurrences. The step of determining the habit trigger indicators may include determining one or more habit temporal indicators based on the temporal indicators of the group. The temporal indicators may include temporal indicators related to a time of day. The temporal indicators may include temporal indicators related to a day of the week.

The method may further include the step of determining the interaction similarity between the interaction indicators of the past activity occurrences of the group based on a user action similarity between the user actions of the group and based on an interaction entity similarity between the interaction entities of the group. The step of determining the interaction entity similarity between the interaction entities of the group may be based on one or more relationships between the interaction entities. The one or more relationships may include relationships to one or more entity collections.

The method may further include the steps of: determining, based on the habit trigger indicators, anticipated or actual entry of the user into the user habit; and providing, to a computing device of the user, information influenced by the user habit based on the determined anticipated or actual entry of the user into the user habit.

The method may further include the steps of: receiving user activity data, the user activity data indicative of one or more of a location of a computing device of a user and user actions via the computing device; determining whether the user activity data is indicative of one or more of the habit trigger indicators; and providing, to a computing device of the user, information influenced by the user habit entry based on the user activity data being indicative of one or more of the habit trigger indicators. The step of providing the information influenced by the user habit entry may include the step of providing information related to the habit interaction entity indicators. The step of providing the information influenced by the user habit entry may include the step of providing information ranked based on the habit interaction entity indicators.

The method may further include the step of determining a confidence measure for the user habit based on a count of the past activity occurrences in the group. The count of past activity occurrences may be a frequency of the past activity occurrences.

The user actions and the interaction entities of the past activity occurrences may be determined based on input from a computing device of the user.

In another aspect, a method is provided and includes the steps of: identifying past activity occurrences of a user, each of the past activity occurrences including: an action identifier, the action identifier indicative of an action of the user in performing the past user activity; an interaction entity identifier, the interaction entity identifier indicative of an entity interacted with in performing the past user activity; and one or more trigger indicators; determining, for each of the past activity occurrences: an entity collection to which the interaction entity of the past user activity belongs; determining a group of the past activity occurrences based on the past activities of the group having at least one communal said entity collection, and the trigger indicators of the past activity occurrences of the group being similar; and determining a user habit based on the group, the user habit including one or more habit interaction entities based on the communal said entity collection, and one or more habit trigger indicators based on one or more of the trigger indicators of the group.

This method and other implementations of technology disclosed herein may each optionally include one or more of the following features.

The trigger indicators of each of the past activity occurrences may include a trigger indicator indicative of at least one of a location, a time, and a precursor action associated with the user performing the past user activity.

The habit interaction entities may include an identifier of the communal said entity collection.

The step of determining the habit interaction entities based on the communal said entity collection may include the step of determining a given member of the communal said entity collection as one of the habit interaction entities, wherein the given member is not identified in the group of past activity occurrences of the user.

The method may further include the step of: determining, for each of the past activity occurrences, an action collection to which the action of the past activity occurrence belongs; wherein the step of determining the group of past user activities may be further based on the past activity occurrences of the group having a communal said action collection; and wherein the user habit may further include one or more habit actions based on the communal said action collection.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine one or more user habits for a user based on one or more determined groups of one or more past user activity occurrences of a user. The determined one or more user habits represent new information that may be associated with a user. The determined one or more user habits may be utilized by one or more systems to, for example, influence (e.g., determine and/or rank) certain information related to the user habit. For example, the information may be influenced based on a determined or anticipated entry of the user into the user habit based on habit trigger indicators associated with the user habit.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A is a representation of example past activity occurrences.

FIG. 2B is a representation of a mapping of a collection of actions to a plurality of user actions of the past user activity occurrences of FIG. 2A.

FIG. 2C is a representation of a mapping of a collection of interaction entities to a plurality of interaction entities of the past user activity occurrences of FIG. 2A.

FIG. 3A is a representation of additional past user activity occurrences.

FIG. 3B is a representation of a mapping of a collection of interaction entities to a plurality of interaction entities of the past user activity occurrences of FIG. 3A.

FIG. 3C is a representation of a mapping of a collection of interaction entities to an interaction entity of the past user activity occurrences of FIG. 3A.

FIG. 3D is a representation of a mapping of a collection of interaction entities to an interaction entity of the past user activity occurrences of FIG. 3A.

FIG. 3E is a representation of an example user habit determined based on the past user activity occurrences of FIG. 3A.

FIG. 4 is a flow chart illustrating an example method of determining a user habit based on past activity occurrences of a user.

DETAILED DESCRIPTION

Figure 1:
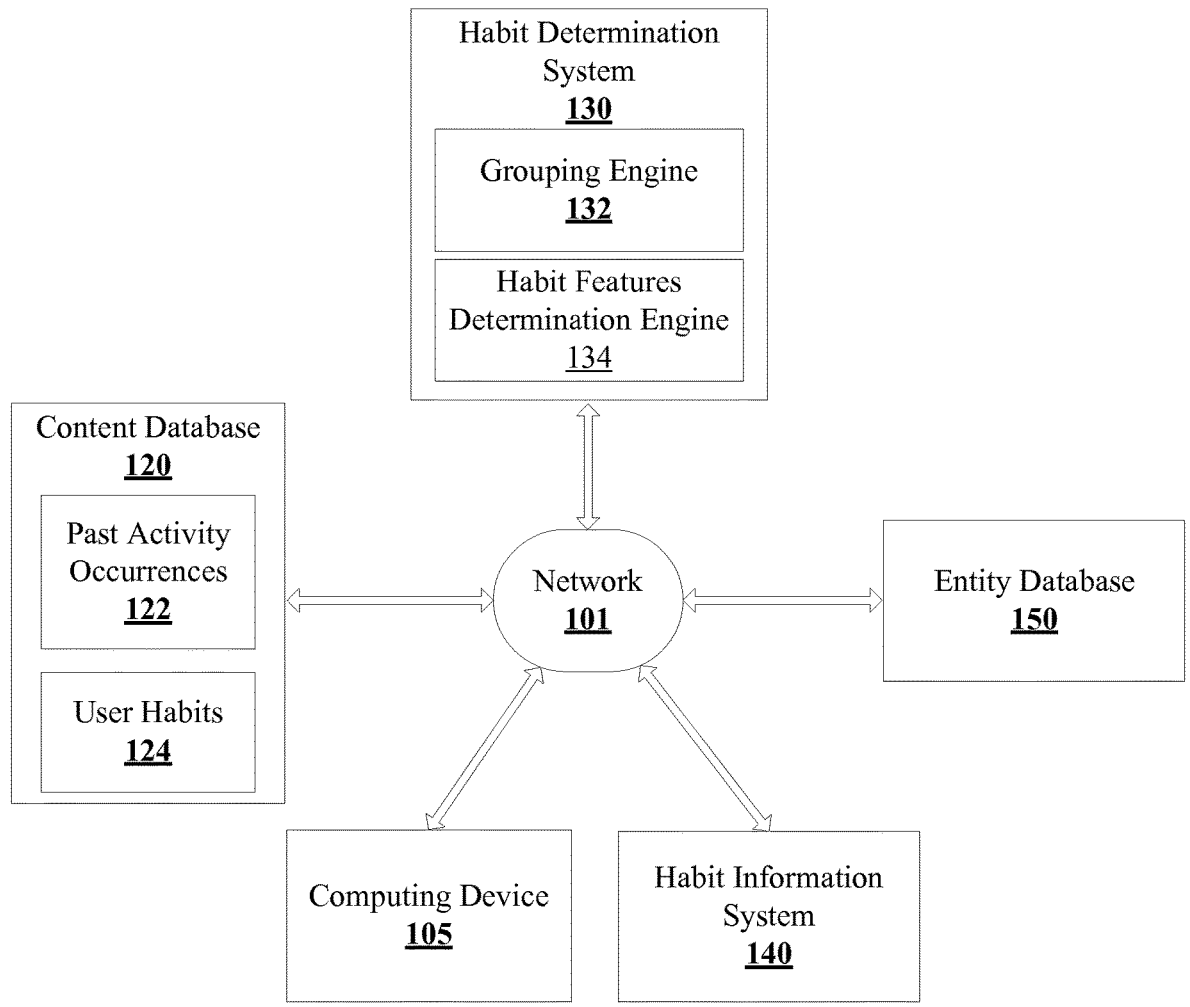
FIG. 1 is a block diagram of an example environment in which a user habit may be determined based on past activity occurrences of a user.

Information related to past activity occurrences of a user may be utilized to determine one or more user habits of the user. For example, a group of one or more past activity occurrences may be determined based on similarity between the past activity occurrences of the group. A user habit may be determined based on the past activity occurrences of the group.

A past activity occurrence of a user includes information related to the past activity occurrence such as one or more user actions and one or more interaction entities interacted with during the user action(s). A user action of a past activity occurrence may be an action that a user has completed and/or indicated interest in completing. For example, a user action may be "buy" and the user may have interest in buying something and/or may have bought something. An interaction entity of a past activity occurrence is an entity that is associated with the user action. For example, a past activity occurrence may have a user action of "buy" and an interaction entity of "bananas," and may indicate the user has bought, or plans to buy bananas.

Information of a past activity occurrence may also include information related to one or more trigger indicators associated with the past activity occurrence. Generally, a trigger indicator of a past activity occurrence identifies a condition related to the past activity occurrence. A trigger indicator of a past activity occurrence may be indicative of, for example, a location, a temporal value (e.g., a date, a time), and/or one or more precursor actions associated with the past activity occurrence. For example, a past activity occurrence may have a user action of "buy", an interaction entity of "groceries", and trigger indicators of it being a Monday (temporal value) when the past activity occurrence occurred, it being 6:00 P.M. (temporal value) when the past activity occurrence started or commenced, the user being at work before the past activity occurrence occurred (location), and the user accessing a couponing application via a computing device before the past activity occurrence occurred (precursor action). As described herein, in some implementations trigger indicators may be associated with a past activity occurrence based on input of a user and/or based on user activity data and/or other content received from a computing device of the user, and associated with the past user activity occurrence based on occurring within a threshold time thereof and/or otherwise.

Utilizing one or more techniques described herein, one or more user habits may be determined based on a plurality of past activity occurrences of the user. For example, a group of one or more past activity occurrences of a user may be determined based on similarity between the past activity occurrences of the group and a user habit may be determined based on the past activity occurrences of the group. For example, the group of past activity occurrences may be determined to be related to one another based on one or more similarity measures between the past activity occurrences of the group, such as one or more similarity measures between the past activity occurrences of the group and one or more entities. Information from the past activity occurrences of the group may then be utilized to determine a user habit for the user.

As one example, the past user activity occurrences of the group may each include at least one user action, at least one interaction entity, and at least one trigger indicator. The term "interaction indication", as used herein may refer to one, or both, of one or more user actions and one or more interaction entities. One or more habit actions of the user habit may be determined based on the user actions of the group, one or more habit interaction entities of the user habit may be determined based on the interaction entities of the group, and one or more habit trigger indicators may be determined based on the trigger indicators of the group.

In some implementations, an indication of one or more components of an activity occurrence and/or a user habit may include an entity identifier. For example, an indication of the user action "buy" may include an identifier of the entity associated with the action of buying. An entity identifier may be associated with an entity in one or more databases, such as entity database 150. In some implementations, one or more components of an activity occurrence and/or a user habit may additionally or alternatively include one or more terms. For example, an indication of the user action "buy" may include the terms "buy" and/or "purchase".

In some implementations, one or more determined user habits may be utilized by one or more systems to, for example, influence information related to the user habit(s). For example, the information may be influenced based on a determined or anticipated entry of the user into the user habit based on satisfaction of one or more conditions associated with the habit trigger indicators of the user habit. For example, an application of a computing device of the user associated with one or more habit actions and/or habit interaction entities of the user habit may be automatically opened and/or more prominently displayed to a user via the computing device based on satisfaction of the conditions of one or more of the habit trigger indicators. Also, for example, information related to one or more habit actions and/or habit interaction entities of the user habit may be displayed to the user via a computing device of the user based on satisfaction of the conditions of one or more of the habit trigger indicators. Also, for example, query suggestions and/or search results associated with the habit actions and/or habit interaction entities of the user habit may be promoted (e.g., have their ranking increased) for potential display to the user via a computing device of the user based on satisfaction of the conditions of one or more of the habit trigger indicators.

Referring to FIG. 1, a block diagram of an example environment is provided in which a user habit may be determined based on past activity occurrences of a user. The environment includes a computing device 105 of a user, a content database 120, a habit determination system 130, a habit information system 140, and an entity database 150. The environment also includes a communication network 101 that enables communication between various components of the environment. In some implementations the communication network 101 may include the Internet, one or more intranets, and/or one or more bus subsystems. The communication network 101 may optionally utilize one or more standard communications technologies, protocols, and/or inter-process communication techniques.

Figure 8:
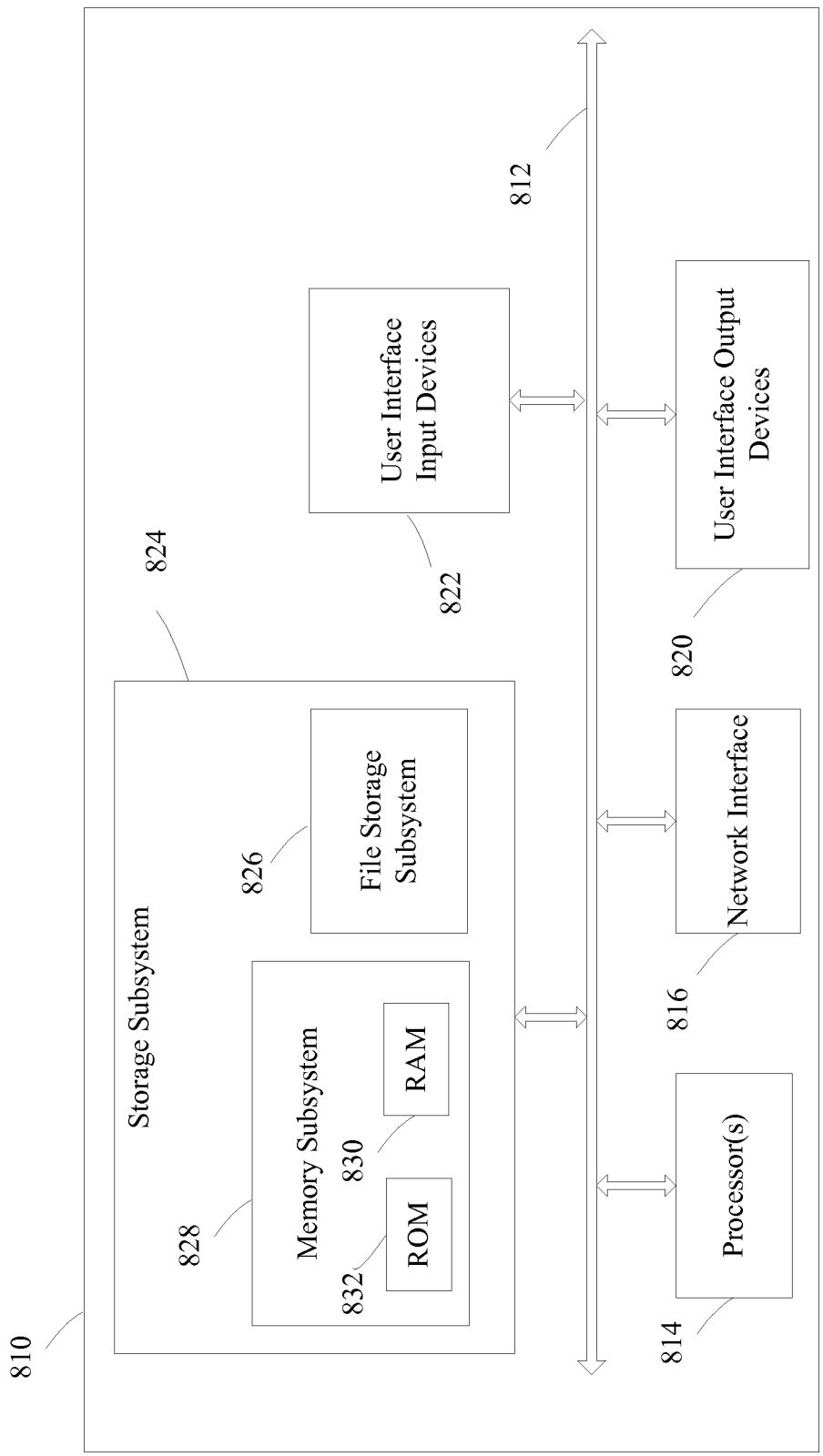
FIG. 8 illustrates a block diagram of an example computer system.

The computing device 105 executes one or more applications and may be, for example, a desktop computer, a laptop computer, a cellular phone, a smartphone, a personal digital assistant (PDA), a tablet computer, a navigation system, a wearable computing device (e.g., glasses, watch, earpiece), or another computing device. The computing device 105 includes memory for storage of data and software applications, a processor for accessing data and executing applications, and components that facilitate communication over the communication network 101. In some implementations, the computing device 105 may include hardware that shares one or more characteristics with the example computer system that is illustrated in FIG. 8. In some implementations, the one or more applications executable by the computing device 105 may include a web browser, a task application, and/or other component that enables, for example, providing of information related to a past user activity occurrence and/or receipt of information related to a determined user habit.

As described herein, user interactions with the computing device 105 and/or one or more additional computing devices associated with the user may optionally be utilized to determine past activity occurrences of the user and/or provide user activity data of the user. Also, in implementations that provide the user with information related to a user habit entry, the information may be provided to the user via the computing device 105 and/or one or more additional computing devices associated with the user. The computing device 105 may optionally execute one or more applications that enable a user to provide information related to a past activity occurrence and/or provide information that may be utilized to determine a past activity occurrence of the user. For example, one or more past activity occurrences of a user may be based on one or more tasks associated with the user such as tasks created via an e-mail application, a calendar application, and/or a web browser executable on computing device 105. In some implementations, tasks may be created by a user via an application that is dedicated to creating user tasks.

In some implementations, content database 120 may include one or more storage mediums and may be utilized to store and/or access one or more aspects of information described herein. For example, content database 120 may be utilized by one or more components to store, modify, and/or access past activity occurrences 122 and/or user habits 124. In some implementations, the content database 120 may store past activity occurrences 122 and/or user habits 124 of multiple users, and, for each user, access to the past activity occurrences 122 and/or user habits 124 of the user may be allowed only for the user and/or one or more other users or components authorized by the user such as habit determination system 130 and/or habit information system 140. In some other implementations, the content database 120 may only store past activity occurrences 122 and/or user habits 124 for a single user. A past activity occurrence of a user may include certain information related to the past activity occurrence such as one or more user actions, interaction entities, and/or trigger indicators as described herein. The included information may be based on input from the user (e.g., typed, spoken, or other input) and/or the included information may be determined based on one or more documents or other content related to the past activity occurrence (e.g., based on received user activity data, e-mails of the user, documents viewed by the user).

In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently. In some implementations, one or more of the past activity occurrences and/or user habits may be stored in a database as an entry. In this specification, the term "entry" will be used broadly to refer to any mapping of a plurality of associated information items. A single entry need not be present in a single storage device and may include pointers or other indications of information items that may be present on other storage devices. For example, an entry may include multiple nodes mapped to one another, with each node including an identifier of an entity or other information item that may be present in another data structure and/or another storage medium.

Past activity occurrences 122 may each include certain information related to the past activity occurrence, such as one or more user actions, interaction entities, and/or trigger indicators. For example, with reference to FIG. 2A, six example past activity occurrences 122A-E are illustrated and each includes a user action, an interaction entity, and one or more trigger indicators. For example, past activity occurrence 122A includes a user action 1222A of "Fix", an interaction entity 1224A of "Faucet", and trigger indicators 1226A1, A2, and A3 of "Saturday", "DIY Website A", and "Search A".

In some implementations, one or more aspects of the included information of a past activity occurrence may be based on input from the user. For example, the past activity occurrence 122A may be created based on input provided by the user via computing device 105 to create a task entry. For example, the user may input the phrase "fix faucet next Saturday" via an application executing on computing device 105. Based on the inputted phrase, a task system may determine "fix" is a user action, "faucet" is an interaction entity, and "Saturday" is a temporal trigger indicator related to the task. For example, in some implementations the task system may utilize one or more natural language processing techniques to identify the term "fix" is a verb, the term "faucet" is the object of the verb, and the term "Saturday" is a proper noun related to a date and that qualifies the phrase "fix faucet". Also, for example, in some implementations the task system may utilize the entity database 150 to determine that the term "fix" is an alias mapped to an entity associated with a "user action" collection of entities, to determine that the term "faucet" is an alias mapped to an entity associated with an "interaction entities" collection of entities, and/or to determine that the term "Saturday" is an alias mapped to an entity associated with a "weekend days" collection of entities.

In some implementations, one or more aspects of the included information of a past activity occurrence may additionally and/or alternatively be based on one or more documents or other content related to the past activity occurrence. For example, the user may submit one or more search queries via the computing device 105 that relate to fixing a faucet and/or view one or more internet documents that relate to fixing a faucet. Based on the submitted search queries and/or viewed internet documents, a task system may determine "fix" is a user action, "faucet" is an interaction entity, and the submitted search queries and/or viewed internet documents are trigger indicators. For example, in some implementations a task system may receive and/or identify one or more entities associated with the queries and/or internet documents and determine, based on those entities, that the user has interest in completing a task to fix a faucet and that those queries and/or internet documents are related to the task. For example, each of the queries and documents may be associated with an entity related to "fixing" items and each of the queries and documents may be associated with an entity related to "faucets". A task system may automatically create a past activity occurrence based on such information, or may prompt the user before creating the past activity occurrence.

As another example, the user may input the phrase "fix faucet next Saturday" via an application executing on computing device 105. Based on the inputted phrase, a task system may determine a past user activity occurrence wherein "fix" is a user action, "faucet" is an interaction entity, and "Saturday" is a temporal trigger indicator related to the task. Additional trigger indicators may be determined for the past activity occurrence based on one or more documents or other content related to the past activity occurrence. For example, the user may, prior to and/or on "next Saturday", view one or more internet documents that relate to fixing a faucet. Based on a close temporal relation of viewing the documents to the activity occurrence and/or the relation of those documents to fixing a faucet (e.g., being associated with a "fixing" and/or "faucet" entity), those documents may be determined as trigger indicators for the past activity occurrence. Also, for example, the user may visit a hardware store prior to and/or on "next Saturday" and locational data related to the computing device 105 of the user may indicate the user visited the hardware store. Based on a close temporal relation of the visit to the activity occurrence and/or relation of the hardware store to fixing a faucet (e.g., the hardware store being associated with a "fixing" and/or "faucet" entity), the visit to the hardware store may be determined as a trigger indicator for the past activity occurrence.

In some implementations, only documents and/or other content provided by and/or accessed by computing device 105 within a threshold temporal period of the anticipated past user activity occurrence (if known) may be considered as a potential trigger indicator for the past activity occurrence. For example, only content provided by and/or accessed by a computing device within 48 hours of the anticipated past user activity occurrence may be considered as a potential trigger indicator.

User habits 124 may each include certain information related to a habit of the user such as one or more habit actions, one or more habit interaction entities, and/or one or more habit trigger indicators. A habit action may be one or more actions that a user performs during a habit. For example, a habit action may be "call" for a habit related to a user action of calling, or a habit action may be "contact" for a habit related to user actions of calling, e-mailing, and/or instant messaging. A habit interaction entity is an entity that is associated with the habit action. For example, a habit may have a habit action of "call" and a habit interaction entity of "bob", "contacts", and/or "family members", for a habit related to a user habit of calling one or more individuals.

Habit trigger indicators identify one or more conditions that indicate an actual entry or anticipated entry of the user into the user habit. For example, a habit related to a user habit of calling one or more individuals may have a habit trigger indicator of the user being located in a vehicle (e.g., as indicated by location data of a computing device of the user and/or pairing of a computing device of the user with a computing device of a vehicle). Also, for example, a habit related to a user habit of calling one or more individuals may have a habit trigger indicator related to the time since the user last entered the habit. For example, the longer it has been since the user last entered the habit, the more indicative the habit trigger indicator may be of the user entering the user habit. As described herein, one or more trigger indicators may optionally be associated with information indicative of how strongly correlated they are to actual and/or anticipated entry of the user into the user habit. For example, one or more trigger indicators may be identified as required trigger indicators (the habit won't be determined to be entered without the conditions of the trigger indicators being present) and/or one or more trigger indicators may be weighted more heavily than other trigger indicators (e.g., the presence of a more heavily weighted first trigger indicator alone may be more indicative of actual or anticipated entry into the user habit than the presence of a less heavily weighted second trigger indicator alone).

In some implementations, an indication of the habit action, habit interaction entity, and/or habit trigger indicator of a user habit entry may include an entity identifier. For example, an indication of the habit action "buy" may include an identifier of the entity associated with the action of buying. Also, for example, an indication of the habit trigger indicator of being at a certain location may include an identifier of an entity associated with the location. In some implementations, an indication of a habit action, a habit interaction entity, and/or a habit trigger indicator in a user habit entry may additionally or alternatively include one or more terms and/or other information. For example, an indication of the habit action "buy" may include the terms "buy" and/or "purchase". Also, for example, an indication of the habit trigger indicator of the user being located in a vehicle may include information related to determining the user is in the vehicle such as an identifier of the computing device of the vehicle, an indicator of user activity data that may indicate the user is in the vehicle, etc.

Habit determination system 130 may determine one or more user habits based on a plurality of past activity occurrences of the user. For example, habit determination system 130 may determine a group of one or more past user activity occurrences of a user based on similarity between the past user activity occurrences of the group and a user habit may be determined based on the past user activity occurrences of the group.

Figures 2D, 2E:
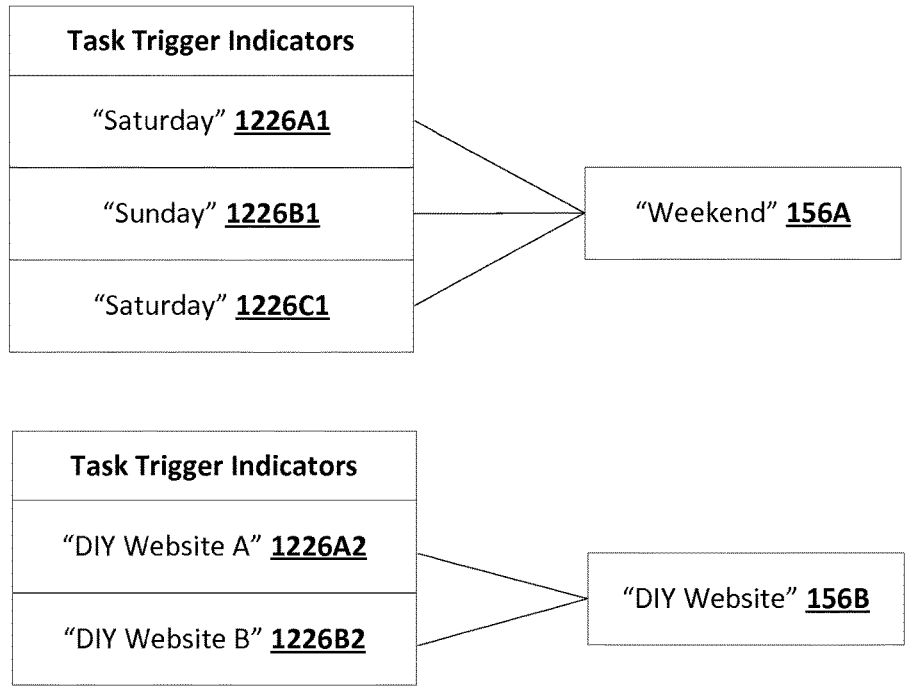
FIG. 2D is a representation of a mapping of collections of trigger indicators to a plurality of trigger indicators of the past user activity occurrences of FIG. 2A.
FIG. 2E is a representation of an example user habit determined based on the past user activity occurrences of FIG. 2A.

One example of determining a user habit based on a plurality of past activity occurrences of the user is provided with reference to FIGS. 2A-2E. FIG. 2A is a representation of example past activity occurrence entries 122A-E. In some implementations more or fewer past activity occurrences may be present and/or utilized to determine a user habit than those illustrated in FIG. 2A.

Habit determination system 130 may determine a group of the past activity occurrences 122A-E that are similar to one another. For example, the habit grouping engine 132 of habit determination system 130 may determine similarity of a group of the past activity occurrences based on one or more relationships between the user actions 1222A-E of the past activity occurrences 122A-E, one or more relationships between the interaction entities 1224A-E of the past activity occurrences, and/or one or more relationships between the trigger indicators 1226A1-E2 of the past activity occurrences.

In some implementations, the utilized relationships may include one or more associations between entities as defined in a database, such as entity database 150. In some implementations, the habit grouping engine 132 may determine similarity of a group based on presence of one or more relationships between members of the group. In some implementations, the habit grouping engine may additionally and/or alternatively determine similarity of a group based on weightings of one or more of the relationships. For example, in some implementations only relationships that have at least a threshold weighting will be considered as relationships. Also, for example, in some implementations the weighting of one or more of the relationships may additionally and/or alternatively be taken into account in determining similarity.

With reference to FIGS. 2B-2D, an example of determining a group of past activity occurrences 122A-C based on similarity between the past activity occurrences 122A-C is described. Similarity measures may be determined between additional potential groups to determine if they should be determined as a group. However, for the sake of brevity, description herein is provided with respect to the group of past activity occurrences 122A-C. FIG. 2B is a representation of a mapping of a collection of actions 152A of "Maintenance actions" to a plurality of user actions 1222A-C of the past user activity occurrences 122A-C. Although only a mapping to a single collection of actions 152A is illustrated and described, in some implementations additional collections of actions may be mapped to past activity occurrences and utilized to determine similarity (e.g., if weightings of the mappings satisfy a threshold). The habit grouping engine 132 may determine user actions 1222A-C of "Fix", "Repair", and "Change" are members of the collection of actions 152A based on, for example, a mapping of the user actions 1222A-C to the collection of actions 152A in the entity database 150.

For example, the entity database 150 may include a mapping (e.g., data defining an association) between entities and one or more attributes and/or other related entities. For example, the user actions 1222A-C may each be mapped in the entity database 150 as a member of the collection of actions "Maintenance actions" 152A. Based on the mappings, and optionally a weighting associated with each of the indicated mappings (e.g., as indicated by metadata associated with the mapping), the grouping engine 132 may determine a user action similarity measure for the user actions 1222A-C. For example, the grouping engine 132 may determine a user action similarity measure for the user actions 122A-C that is indicative of similarity if each of the user actions 1222A-C is mapped to the collection of actions 152A with at least a threshold weighting.

In some implementations, the determined user action similarity measure may be, for example, a number (e.g., numbers from 0 to 1), the magnitude of which is indicative of the degree of similarity. For example, 0.8 may be indicative of a higher degree of similarity than 0.5. In some implementations, the user action similarity measure may be a true/false value (e.g., a 0 or a 1), with the true value indicating at least a threshold level of similarity and the false value indicating a lack of at least a threshold level of similarity.

FIG. 2C is a representation of a mapping of a collection of interaction entities 154A to a plurality of interaction entities 1224A-C of the past user activity occurrences of FIG. 2A. Although only a mapping to a single collection of interaction entities 154A is illustrated and described, in some implementations additional collections of interaction entities may be mapped to past activity occurrences and utilized to determine similarity. The habit grouping engine 132 may determine user interaction entities 1224A-C of "Faucet", "Door", and "Filters" are members of the collection of interaction entities 154A based on, for example, a mapping of the interaction entities 1224A-C to the collection of interaction entities 154A in the entity database 150.

For example, the user interaction entities 1224A-C may each be mapped in the entity database 150 as a member of the collection of interaction entities "Home Items" 154A. Based on the mappings, and optionally a weighting associated with each of the indicated mappings, the grouping engine 132 may determine an interaction entity similarity measure for the interaction entities 1224A-C. For example, the grouping engine 132 may determine an interaction entity similarity measure for the interaction entities 1224A-C that is indicative of similarity if each of the user interaction entities 1224A-C is mapped to the collection of actions 152A with at least a threshold weighting. In some implementations, the determined interaction entity similarity measure may be, for example, a number, the magnitude of which is indicative of the degree of similarity. In some implementations, the similarity measures may be a true/false value, with the true value indicating at least a threshold level of similarity and the false value indicating a lack of at least a threshold level of similarity.

FIG. 2D is a representation of a mapping of collections of trigger indicators 156A and 156B to a plurality of trigger indicators of the past user activity occurrences 122A-C of FIG. 2A. The habit grouping engine 132 may determine trigger indicators 1226A1, B1, and C1 of "Saturday", "Sunday", and "Saturday" are members of the collection of trigger indicators 156A of "Weekend" based on, for example, a mapping of the habit trigger indicators 1226A1, B1, and C1 to the collection of trigger indicators 156A in the entity database 150. The habit grouping engine 132 may determine trigger indicators 1226A2 and B2 of "DIY Web site A" and "DIY Website B" are members of the collection of trigger indicators 156B of "DIY Websites" based on, for example, a mapping of the websites 1226A2 and B2 to the collection 156B in the entity database 150 (e.g., both may be mapped to an entity associated with DIY (do it yourself)). The habit grouping engine 132 may determine trigger indicators 1226A3 and B3 of "Search A" and "Search B" are not members of a common collection of trigger indicators based on, for example, lack of a mapping (or lack of a mapping having a sufficient weighting) of the search queries 1226A3-B3 to any collection in the entity database 150.

Based on the mappings of FIG. 2D (and optionally the lack of a mapping for "Search A" and "Search B"), and optionally a weighting associated with each of the indicated mappings, the grouping engine 132 may determine a trigger similarity measure for the trigger indicators 1226A1-C1 of past activity occurrences. In some implementations, a trigger similarity measure for a potential grouping based on the trigger indicators may be omitted. In some implementations, a trigger similarity measure based on the trigger indicators may only be determined if the user action similarity measure and/or the interaction entity similarity measure for the potential grouping satisfy a threshold.

In some implementations, the determined trigger similarity measure may be, for example, a number, the magnitude of which is indicative of the degree of similarity. In some implementations, the trigger similarity measure may be a true/false value, with the true value indicating at least a threshold level of similarity and the false value indicating a lack of at least a threshold level of similarity.

The grouping engine 132 may determine the past activity occurrences 122A-C are a grouping based on the user action similarity measure, the interaction entity similarity measure, and/or the trigger similarity measure. For example, if one or more (e.g., all) of the scores satisfies a threshold (the same threshold, or different thresholds), then the past activity occurrences 122A-C may be determined to be a grouping.

In some implementations, the grouping engine 132 may determine an overall similarity measure based on the user action similarity measure, the interaction entity similarity measure, and/or the trigger indicators similarity measure. The grouping engine 132 may compare the overall similarity measure to a threshold to determine if the past activity occurrences 122A-C are a grouping. One or more techniques may be utilized to determine the overall similarity measure. For example, a weighted and/or unweighted average of one or more of the individual similarity measures may be utilized. Also, for example, a sum of the similarity measures may additionally and/or alternatively be utilized. Additional and/or alternative techniques may be utilized to determine a grouping of past user activity occurrences. For example, additional and/or alternative techniques may be utilized to determine one or more similarity measures described herein.

FIG. 2E is a representation of an example user habit 124A determined based on the past activity occurrences of FIG. 2A. In some implementations, the habit features determination engine 134 may determine the user habit 124A based on the past activity occurrences 122A-C of FIG. 2A. The user habit 124A includes a habit action 1242A of "Maintenance Actions", a habit interaction entity 1244A of "Home Items", and habit trigger indicators 1246A1 and A2 of "Weekend" and "DIY Websites".

The habit action 1222A of "Maintenance Actions" identifies a collection of action entities that relate to maintenance actions, such as, for example, action entities related to the actions of "fixing", "repairing", "changing", "improving", etc. In some implementations, the habit features determination engine 134 may determine the habit action 1242A of "Maintenance Actions" based on the collection of actions 152A of "Maintenance actions" that is mapped to the user actions 1222A-C of the past user activity occurrences 122A-C.

Although only a single habit action 1242A is illustrated in FIG. 2E, in some implementations, habit features determination engine 134 may determine additional or alternative habit actions 1242A for the user habit. For example, in addition to or as an alternative to including the habit action 1242A with the user habit 124A, one or more members of the collection of action entities identified by habit action 1242A may be included in the user habit 124A. For example, the user actions 1222A-C of the grouping of past user activity occurrences 122A-C may be included and/or additional action entities (e.g., "improving"), that are not included in the user actions 1222A-C may be included. As another example, in addition to or as an alternative to including the habit action 1242A with the user habit 124A, one or more additional action entities to which one or more of the user actions 1222A-C are related (e.g., as based on mappings of entity database 150), may be included. For example, additional collections of action entities of which one or more of the user actions 1222A-C are members may be determined and those collections and/or other members of those collections may be included in the user habit 124A.

In some implementations, such as those where multiple habit actions are included, weightings may optionally be associated with one of more of the habit actions and/or weightings associated with one or more potential habit actions may be utilized to determine whether to include the potential habit actions in the user habit 124A. For example, where members of a collection of actions are used as habit actions, the weighting of each member may be based on the weighting of the member for the collection and/or a number of occurrences (if any) of the member in the user actions of the grouping. For example, the actions of "fixing", "repairing", "changing", and "improving" may be members of the habit action 1242A of "Maintenance Actions" and they may be utilized as habit actions. The weighting of "changing" may be based on the weighting of "changing" in a mapping to the collection of habit actions 1242A (e.g., as identified in the entity database 150) and/or based on a number of occurrences (1) of "changing" in the user actions 1222A-C of the group. Likewise, the weighting of "improving" may be based on the weighting of "improving" in a mapping to the collection of habit actions 1222A and/or based on a number of occurrences (0) of "improving" in the user actions 1222A-C of the group. Basing a weighting on a number of occurrences may include basing the weighting on a raw count and/or some frequency over time and/or over a larger group (such as the determined group of past activity occurrences 122A-C). As described, in some implementations, the weightings associated with one or more potential habit actions may be utilized to determine whether to associate the potential habit actions with the user habit. For example, if the weighting of "improving" fails to satisfy a threshold, it may be prevented from being associated with the user habit 124A.

The habit interaction entity 1244A of "Home Items" identifies a collection of interaction entities related to a house such as, for example, interaction entities related to "faucets", "doors", "filters", "dishwashers", "air conditioners", "furnaces", etc. In some implementations, the habit features determination engine 134 may determine the habit interaction entity 1244A based on the collection of interaction entities 154A of "Home Items" that is mapped to the interaction entities 1224A-C of the past activity occurrences 122A-C.

Although only a single habit interaction entity 1244A is illustrated in FIG. 2E, in some implementations, habit features determination engine 134 may determine additional habit interaction entities for the user habit. For example, in addition to or as an alternative to including the interaction entity 1244A with the user habit 124A, one or more members of the collection of interaction entities identified by interaction entity 1244A may be included in the user habit 124A. As another example, in addition to or as an alternative to including the interaction entity 1244A with the user habit 124A, one or more additional interaction entities to which one or more of the interaction entities 1244A-C are related (e.g., as based on mappings of entity database 150), may be included. In some implementations, such as those where multiple habit actions are included, weightings may optionally be associated with one of more of the interaction entities and/or weightings associated with one or more potential habit interaction entities may be utilized to determine whether to include the potential habit interaction entities in the user habit 124A.

The habit trigger indicators 1246A1 and A2 of "Weekend" and "DIY Websites" identify one or more conditions that indicate an actual entry or anticipated entry of the user into the user habit. For example, the trigger indicator 1246A1 of "Weekend" may identify a condition of it being a weekend day and actual or anticipated entry into the user habit may be more likely to be determined if it is a weekend day. Also, for example, the trigger indicator 1246A2 of "DIY Website" may identify a condition related to determining visits by the user to one of one or more do it yourself websites (optionally, either on the weekend or within a predetermined temporal period of the weekend).

In some implementations, the habit features determination engine 134 may determine the habit trigger indicators 1246A1 and A2 based on the collection of trigger indicators 156A of "Weekend" that is mapped to the trigger indicators 1226A1, B1, and C1 and based on the collection of trigger indicators 156B of "DIY Website" that is mapped to the trigger indicators 1226A2 and B2.

In some implementations, habit features determination engine 134 may determine additional and/or alternative habit trigger indicators for the user habit 124A. For example, in addition to or as an alternative to including the habit trigger indicator 1246A1 with the user habit 124A, one or more members of the collection of trigger indicators identified by the habit trigger indicator 1246A1 may be included in the user habit 124A. For example, "Saturday" and "Sunday" may be included. As another example, in addition to or as an alternative to including the trigger indicators 1246A2 and B2 with the user habit 124A, one or more additional trigger indicators to which one or more of the trigger indicators actions 1226A2 and B2 are related (e.g., as based on mappings of entity database 150), may be included. For example, the websites of trigger indicators 1226A2 and B2 may further both be mapped to an entity associated with "hardware items" and "hardware items websites" may be utilized as a trigger indicator.

In some implementations, such as those where multiple habit trigger indicators are included, weightings may optionally be associated with one of more of the habit trigger indicators and/or weightings associated with one or more potential habit trigger indicators may be utilized to determine whether to include the potential trigger indicator in the user habit. For example, where members of a collection of trigger indicators are used as habit trigger indicators, the weighting of each member may be based on the weighting of the member for the collection and/or a number of occurrences (if any) of the member in the trigger indicators of the grouping. For example, the trigger indicators of "Saturday" and "Sunday" may be members of the trigger indicator 1246A1 of "Weekend" and they may be utilized as trigger indicators. The weighting of "Saturday" and "Sunday" may be based on their weightings to the collection of trigger indicators 1246A1 (e.g., the may both have equal weighting) and/or based on a number of occurrences (2 for Saturday, 1 for Sunday) in the trigger indicators 1226A1, B1, and C1 of the group. Thus, in the example, a weighting of "Saturday" may be greater than a weighting for "Sunday" due to the greater number of occurrences.

As another example, where multiple trigger indicators are present in trigger indicators of a grouping of past activity occurrences utilized to determine a habit trigger indicator that identifies a collection, the weighting of the determined habit trigger indicator may be based on the weightings of the trigger indicators to the collection and/or a number of occurrences of the trigger indicators in the past activity occurrences. For example, the habit trigger indicator 1246A1 of "Weekend" may have a stronger weighting than the habit trigger indicator 1246A2 of "DIY Website" based on greater weightings of trigger indicators 1226A1, B1, and C1 to the habit trigger indicator 1246A1 and/or based on a number of occurrences (3 as compared to 2) of trigger indicators 1226A1, B1, and C1.

As described, in some implementations, the weightings associated with one or more habit trigger indictors may be utilized to determine how strongly those habit trigger indicators are considered in determining anticipated and/or actual entry of the user into the user habit. For example, satisfaction of a condition related to a heavily weighted habit trigger indicator of a user habit standing alone may be more indicative of anticipated and/or actual entry of the user into the user habit than satisfaction of a condition related to a less heavily weighted habit trigger indicator of the user habit standing alone.

In some implementations, weightings may be provided between information of a user habit. The weighting between two or more pieces of information of a user habit is indicative of a strength of correlation between such pieces of information. The weighting between information of a user habit may be in addition to, or as an alternative to weightings associated with the information itself. For example with reference to FIG. 2E, a weighting may be provided between the habit trigger indicators 1246A1 and A2. For example, trigger indicator 1246A1 may have a weighting with respect to trigger indicator 1246A2 that indicates those two trigger indicators have a high degree of correlation to one another (e.g., the trigger indicators often both occur together in relation to the user habit). For example, the habit features determination engine 134 may determine the high degree of correlation based on co-occurrence of members of the habit trigger indicators 1246A1 and 1246A2 in two out of three of the past activity occurrences (122A and 122B). In some implementations, when two or more habit trigger indicators have a weighting relative to one another that satisfies a threshold weighting, satisfaction of conditions related to both habit trigger indicators may be required before anticipated and/or actual entry of the user into the user habit is determined. In some other implementations, when two or more habit trigger indicators have a weighting relative to one another that is indicative of a high degree of correlation, satisfaction of conditions related to both habit trigger indicators may be more likely (but not necessarily required) to lead to determination of anticipated and/or actual entry of the user into the user habit.

In some implementations, habit determination system 130 may determine a confidence measure for the habit entry 124A. For example, the habit determination system 130 may determine the confidence measure based at least in part on a count of the past activity occurrences in a group of past activity occurrences associated with the user habit. For example, five past activity occurrences associated with a user habit may be less indicative of confidence than ten past activity occurrences associated with a user habit. Basing a confidence measure on a count of occurrences may include basing the weighting on a raw count and/or some frequency over time (e.g., the last X days) and/or over a larger group (such as all past activity occurrences over a time period). An optionally determined confidence measure may be utilized, for example, to determine when and/or to what extent a user habit may influence information provided to a computing device of a user.

In some implementations, the habit determination system 130 may create the user habit 124A only upon approval of the user with which the user habit entry 124A is associated. A user may have control over whether user habits are created and/or may review existing user habits and choose whether one or more user habits should be removed. In some implementations, one or more encryption technologies are utilized to encrypt past activity occurrences and/or user habits to promote secure storage. For example, in some implementations a wrapped key, AES-based encryption, and/or other encryption technologies such as strong encryption technologies may be utilized.

As described, in some implementations a user habit may include multiple habit actions, multiple habit interaction entities, and/or multiple trigger indicators. In some of those implementations, weightings may optionally be associated with one or more of the multiple habit actions, interaction entities, and/or trigger indicators. Each weighting may be generally indicative of the strength of the association of the respective item to the user habit entry. With reference to FIGS. 3A-3E, an example of determining a user habit entry with multiple weighted habit interaction entities and multiple weighted trigger indicators is described.

FIG. 3A is a representation of additional past user activity occurrences 122F-J. Habit determination system 130 may determine the past user activity occurrences 122F-H constitute a group of past activity occurrences that are similar to one another utilizing, for example, one or more techniques described herein.

FIG. 3B is a representation of a mapping of a collection of interaction entities 154B of "Family Members" to interaction entities 1224G, H, and I of the past user activity occurrences 122G, H, and I of FIG. 3A. The habit features determination engine 134 may determine user interaction entities 1224G, H, and I of "Mom", "Brother", and "Aunt" are members of the collection of interaction entities 154B based on, for example, a mapping of aliases associated with the interaction entities 1224G, H, and I to the collection of interaction entities 154B in the entity database 150. For example, aliases for the interaction entities 1224G, H, and I may be determined from a contacts database of the user (e.g., a "phone book" of the user that includes the aliases) and/or other information source.

FIG. 3C is a representation of a mapping of a collection of interaction entities 154C of "Businesses" to an interaction entity 1224F of "Business 1" of the past user activity occurrences of FIG. 3A. The habit features determination engine 134 may determine user interaction entities 1224G, H, and I of "Mom", "Brother", and "Aunt" are members of the collection of interaction entities 154C based on, for example, a mapping of an alias and/or phone number associated with the interaction entity 1224F to the collection of interaction entities 154C in the entity database 150. For example, "Business 1" may be mapped to a collection of entities associated with businesses.

FIG. 3D is a representation of a mapping of a collection of interaction entities 154D of "Other Individuals" to an interaction entity 1224J of "John" of the past user activity occurrences of FIG. 3A. The habit features determination engine 134 may determine user interaction entity 1224J is a member of the collection of interaction entities 154C based on, for example, a mapping of "John" to a name of an individual and determining that the John is not associated with an alias identifying him as a family member of the user in a contacts database of the user and/or other information source.

FIG. 3E is a representation of an example user habit 124B determined based on the past user activity occurrences of FIG. 3A. In some implementations, the habit features determination engine 134 may determine the user habit 124B based on the past activity occurrences 122F-J of FIG. 3A. The user habit 124B includes a habit action 1242B of "Call"; habit interaction entities 1244B1, B2, and B3 of "Family Members", "Businesses", and "Other Individuals"; and habit trigger indicators 1246B1, B2, and B3 of "Pairing With Vehicle", "Weekday", and "5:00-6:00".

The habit action 1222B of "Call" identifies a single action that relates to the action of "calling". In some implementations, the habit features determination engine 134 may determine the habit action 1222B of "Call" based on all of the user actions 1222F-J of the past user activity occurrences 122A-J only including the user action "Call".

The habit interaction entity 1224B1 of "Family Members" identifies a collection of entities and may be determined by the habit features determination engine 134 based on the mapping described with respect to FIG. 3B. The habit interaction entity 1224B1 of "Family Members" is also associated with a weighting of "0.6". The habit features determination engine 134 may determine the weighting based on the frequency of occurrences of members of the collection of entities of interaction entity 1224B1 in the group of past activity occurrences 122F-J. For example, members of the collection appear three times (122G, H, and J) out of five past activity occurrences (3/5=0.6). As described herein, additional and/or alternative factors may be utilized to determine a weighting.

The habit interaction entity 1224B2 of "Businesses" identifies a collection of entities and may be determined by the habit features determination engine 134 based on the mapping described with respect to FIG. 3C. The habit interaction entity 1224B2 of "Businesses" is also associated with a weighting of "0.2". The habit features determination engine 134 may determine the weighting based on the frequency of occurrences of members of the collection of entities of interaction entity 1224B2 in the group of past activity occurrences 122F-J. For example, members of the collection appear once (122A) out of five past activity occurrences (1/5=0.2). As described herein, additional and/or alternative factors may be utilized to determine a weighting.

The habit interaction entity 1224B3 of "Other Individuals" identifies a collection of entities and may be determined by the habit features determination engine 134 based on the mapping described with respect to FIG. 3D. The habit interaction entity 1224B3 of "Other Individuals" is also associated with a weighting of "0.2". The habit features determination engine 134 may determine the weighting based on the frequency of occurrences of members of the collection of entities of interaction entity 1224B3 in the group of past activity occurrences 122F-J. For example, members of the collection appear once (122J) out of five past activity occurrences (1/5=0.2). As described herein, additional and/or alternative factors may be utilized to determine a weighting.

The habit trigger indicators 1246B1, B2, and B3 of "Pairing With Vehicle", "Weekday", and "5:00-6:00" identify one or more conditions that indicate an actual entry or anticipated entry of the user into the user habit. For example, the trigger indicator 1246B1 of "Pairing With Vehicle" may identify a condition related to determining a computing device of the user has paired with a computing device of the vehicle (e.g., via Bluetooth). Also, for example, the trigger indicator 1246B2 of "Weekday" may identify a condition of it being a week day and actual or anticipated entry into the user habit may be more likely to be determined if it is a week day. Also, for example, the trigger indicator 1246B3 of "5:00-6:00" may identify a condition related to determining it is between the hours of 5:00 and 6:00 and may be based on an identified range of times present in the trigger indicators 1226F3, G3, H3, I3, and J3.

Each of the habit trigger indicators 1246B1, B2, and B3 include an associated weighting. For example, the habit trigger indicators 1246B1 and B3 of "Pairing With Vehicle" and "5:00-6:00" have a weighting of "required" (indicating the condition associated with the trigger indicator must be present to indicate actual or anticipated entry into the user habit) and the habit trigger indicator 1246B2 has a weighting of "0.8". The habit features determination engine 134 may determine the weighting based on the frequency of occurrences of trigger indicators corresponding to the habit trigger indicators in the group of past activity occurrences 122F-J. For example, trigger indicators corresponding to the habit trigger indicators 1246B1 (1226F1, G1, H1, I1, and J1) and 1246B3 (1226F3, G3, H3, I3, and J3) occur in all of the past activity occurrences 122F-J. Also, for example, trigger indicators corresponding to the habit trigger indicators 1246B2 (1226F2, H2, I2, and J2) occur in four out of five (4/5="0.8") of the past activity occurrences 122F-J. As described herein, additional and/or alternative factors may be utilized to determine a weighting.

In some implementations, habit information system 140 may provide information that is influenced by a user habit entry to a user based on one or more trigger indicators associated with the habit entry. For example, the habit information system 140 may provide commands to an application of a computing device of the user associated with one or more habit actions and/or habit interaction entities of the user habit to cause the application to be automatically opened and/or more prominently displayed to a user via the computing device based on satisfaction of the conditions of one or more of the habit trigger indicators. Also, for example, the habit information system 140 may provide information related to one or more habit actions and/or habit interaction entities of the user habit for display to the user via a computing device of the user based on satisfaction of the conditions of one or more of the habit trigger indicators.

Figure 6:
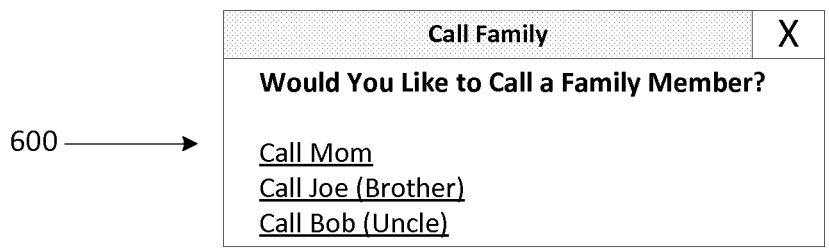
FIG. 6 is an example of information influenced by a user habit of the user that may be provided to a user.

For example, the habit information system 140 may provide recommendations to the user that conform to the user habit. For example, with reference to FIG. 6, a recommendation based on the user habit 124B of FIG. 3E may be presented in a display 600 that provides a recommendation to call a family member with a list of family members displayed. Each of the family members may be selected by a user to assist in calling the selected family member (e.g., selection may auto populate the number for the family member in a phone dialing application and/or auto dial the number for the family member). For example, the habit information system 140 may provide information related to the display 600 to computing device 105 to enable computing device 105 to display the information to the user in display 600.

Figure 7:
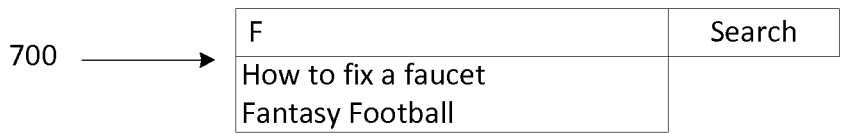
FIG. 7 is another example of information influenced by a user habit of the user that may be provided to a user.

Also, for example, query suggestions and/or search results associated with the habit actions and/or habit interaction entities of the user habit may be promoted (e.g., have their ranking increased) for potential display to the user via a computing device of the user based on satisfaction of the conditions of one or more of the habit trigger indicators. For example, with reference to FIG. 7, autocomplete suggestions may be influenced based on the user habit 124A of FIG. 2E as illustrated in display 700 that provides the autocomplete suggestion "How to fix a faucet" as the most highly ranked autocomplete suggestion. In some implementations, the habit information system 140 may provide information related to the user habit 124A to an autocomplete suggestion system that causes the autocomplete suggestion system to promote the ranking of autocomplete suggestion related to the user habit 124A. For example, "How to fix a faucet" may only be the most highly ranked autocomplete suggestion for the user for the partial query "F" when the habit information system 140 determines anticipated or actual entry of the user into the user habit 124A and provides information related to the user habit 124A to an autocomplete suggestion system that causes the autocomplete suggestion system to promote the ranking of autocomplete suggestion related to the user habit 124A.

In some implementations, the habit information system 140 may utilize received user activity data that is indicative of one or more of a location of a computing device of the user and/or user actions via the computing device to determine whether one or more conditions associated with one or more of the habit trigger indicators of a use habit have been satisfied. For example, received user activity data may include data indicative of a location of the computing device 105 such as data based on GPS, Wi-Fi, and/or cellular tower indicated locations of the computing device 105. Also, for example, received user activity data may include data indicative of search queries submitted via the computing device 105 (e.g., queries local to the computing device 105 and/or submitted to a search engine), documents visited via the computing device 105 (e.g., documents local to the computing device 105 and/or accessed via the Internet), entities contacted via the computing device 105 (e.g., e-mailed, called, instant messaged), applications executed via the computing device, etc. Received user activity data may be provided directly by the computing device 105 and/or by another component with which the computing device 105 communicates (e.g., a search system to which the computing device 105 submitted a search query). In some implementations, satisfaction of one or more conditions of a user habit entry may be determined independent of received user activity data (e.g., those based on day of the week, time of the day).

Habit information system 140 may provide information related to a user habit when the conditions associated with one or more habit trigger indicators have been satisfied. For example, in some implementations, habit information system 140 may provide information related to the user habit only when all of the conditions associated with all of the habit trigger indicators of the user habit have been satisfied. In some implementations, the habit information system 140 may provide information related to the user habit when the conditions associated with less than all of the habit trigger indicators have been satisfied. For example, as described herein, in some implementations one or more of the habit trigger indicators may be indicated as required and/or have one or more weightings associated therewith. For example, with reference to FIG. 3E, the habit trigger indicators 1246B1 and B3 are "required" and the habit trigger indicator 1246B2 has a weighting of "0.8". In some implementations, information may be provided when conditions are satisfied for the habit trigger indicators 1246B1 and B3 (irrespective of satisfaction of condition(s) associated with habit trigger indicator 1246B2).

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

The habit determination system 130, the habit information system 140, and/or one or more additional components of the example environment of FIG. 1 may each include memory for storage of data and software applications, a processor for accessing data and executing applications, and components that facilitate communication over a network. In some implementations, the habit determination system 130 and the habit information system 140 may include hardware that shares one or more characteristics with the example computer system that is illustrated in FIG. 8. The operations performed by one or more components of the example environment may optionally be distributed across multiple computer systems. For example, the steps performed by habit determination system 130 may be performed via one or more computer programs running on one or more servers in one or more locations that are coupled to each other through a network.

Referring to FIG. 4, a flow chart is illustrated of an example method of determining a user habit based on past activity occurrences of a user. Other implementations may perform the steps in a different order, omit certain steps, and/or perform different and/or additional steps than those illustrated in FIG. 4. For convenience, aspects of FIG. 4 will be described with reference to one or more components of FIG. 1 that may perform the method such as the habit determination system 130.

At step 400, a plurality of past activity occurrences of a user are identified. In some implementations, the past activity occurrences are identified from content database 120 (e.g., one or more entries of past activity occurrences 122) by a component that shares one or more with habit determination system 130. The past activity occurrences each include certain information related to a past activity occurrence such as one or more user actions, interaction entities, and/or trigger indicators. For example, with reference to FIG. 2A, an example past activity occurrence 122A includes a user action 1222A of "Fix", an interaction entity 1224A of "Faucet", and trigger indicators 1226A1, A2, and A3 of "Saturday", "DIY Website A", and "Search A". As described herein, one or more aspects of the included information of a past activity occurrence may be based on input from the user and/or may be based on one or more documents or other content associated with the user.

At step 405, a grouping of the past user activity occurrences identified at step 400 is determined. In some implementations, the grouping is determined by a component that shares one or more characteristics with the habit grouping engine 132 of habit determination system 130. In some implementations, the habit grouping engine 132 may determine similarity of a group based on presence of one or more relationships between members of the group. In some implementations, the habit grouping engine 132 may additionally and/or alternatively determine similarity of a group based on weightings of one or more of the relationships. For example, in some implementations only relationships that have at least a threshold weighting will be considered as relationships. Also, for example, in some implementations the weighting of one or more of the relationships may additionally and/or alternatively be taken into account in determining similarity.

At step 410, one or more habit user actions, habit interaction entities, and one or more habit trigger indicators are determined based on the group of step 405. In some implementations, these items are determined by a component that shares one or more characteristics with the habit features determination engine 134 of the habit determination system 130.

In some implementations, one or more of the habit actions, the habit interaction entities, and the habit trigger indicators may be based on one or more collections that encompass a plurality of the respective actions, interaction entities, and trigger indicators of the past user activity occurrences of the group (and, optionally, additional information items). For example, a habit action may be a collection of actions "contact" that encompasses user actions of "call" and "email" of past user activity occurrences of a group and/or additional user actions such as "text". Also, for example, a habit interaction entity may be a collection of interaction entities "family members" that encompasses interaction entities of "mom", "brother", and "aunt" of past user activity occurrences of a group and/or additional interaction entities such as "sister". Also, for example, a habit trigger indicator may be a collection of trigger indicators such as "Weekday" that encompasses trigger indicators of "Monday", "Wednesday", and "Thursday" of past user activity occurrences of a group and/or additional trigger indicators such as "Friday".

In some implementations, weightings may optionally be associated with one or more of the habit actions, the habit interaction entities, and the habit trigger indicators. For example, where members of a collection of actions are used as habit actions, the weighting of each member may be based on the weighting of the member for the collection and/or a number of occurrences (if any) of the member in the user actions of the grouping. In some implementations, weightings associated with one or more potential habit actions, habit interaction entities, and/or habit trigger indicators may be utilized to determine whether to include the potential items in a habit of the user.

At step 415, a user habit that includes the habit user action, the habit interaction entities, and the habit trigger indicators is associated with the user. In some implementations, the user habit is associated with the user by a component that shares one or more characteristics with the habit features determination engine 134 of the habit determination system 130. In some implementations, weightings associated with one or more of the components of the user habit may also be included in the user habit. In some implementations the user habit is stored as an entry in a database, such as an entry of user habits 124 of content database 120. In some implementations, access to the user habit may be allowed only for the user and/or one or more other users or components authorized by the user.

Figure 5:
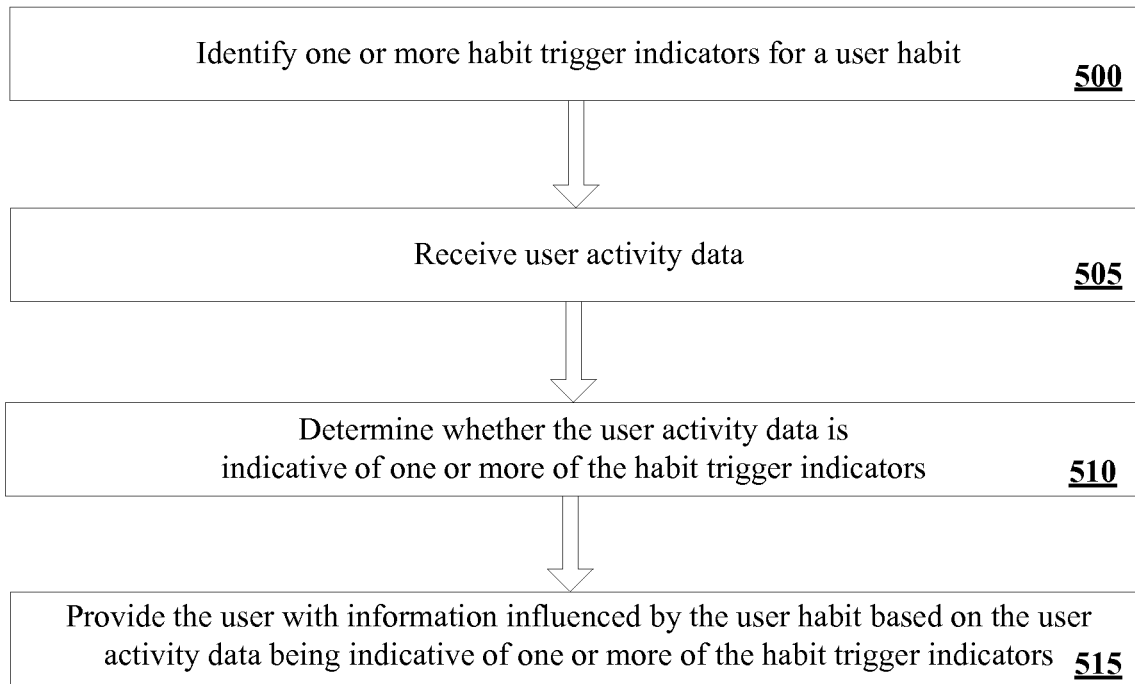
FIG. 5 is a flow chart illustrating an example method of providing a user with information influenced by a user habit of the user.

Referring to FIG. 5, a flow chart is illustrated of an example method of providing a user with information influenced by a user habit of the user. Other implementations may perform the steps in a different order, omit certain steps, and/or perform different and/or additional steps than those illustrated in FIG. 5. For convenience, aspects of FIG. 5 will be described with reference to one or more components of FIG. 1 that may perform the method such as the habit information system 140.

At step 500, one or more habit trigger indicators for a user habit of a user are identified. In some implementations, the habit trigger indicators are identified from content database 120 (e.g., one or more entries of user habits 124) by a component that shares one or more characteristics with habit information system 140. The habit trigger indicators identify one or more conditions that indicate anticipated and/or actual entry of the user into the user habit. As described herein, one or more of the conditions of some habit trigger indicators may relate to user activities as indicated by received user activity data and one or more of the conditions of some habit trigger indicators may relate to other data that is not dependent on user activities (e.g., a trigger indicator based on a date or time).

At step 505, user activity data is received. Received user activity data is indicative of one or more of a location of a computing device of the user and/or user actions via the computing device. In some implementations, the habit information system 140 may receive the user activity data. Received user activity data may be provided directly by the computing device 105 and/or by another component with which the computing device 105 communicates (e.g., content database 120 and/or a search system to which the computing device 105 submitted a search query).

At step 510, it is determined whether the user activity data is indicative of one or more of the habit trigger indicators. In some implementations, the habit information system 140 may determine whether the user activity data is indicative of one or more of the habit trigger indicators. Determination of whether user activity data is indicative of a habit trigger indicator may be based on whether the user activity data satisfies one or more conditions of the habit trigger indicator. For example, for a habit trigger indicator of "DIY Website" having a condition of a visit to a DIY website, it may be determined if the user activity data is indicative of a visit to a website that is mapped to a DIY entity (e.g., in entity database 150).

At step 515, the user is provided with information influenced by the user habit based on the user activity data being indicative of one or more of the habit trigger indicators. In some implementations, provided influenced information may include a display of information related to one or more habit actions and/or habit interaction entities of the user habit. In some implementations, provided influenced information may include query suggestions and/or search results associated with the habit actions and/or habit interaction entities of the user habit that have been promoted for potential display to the user via a computing device of the user.

In some implementations, habit information system 140 may provide information influenced by the user habit entry when the conditions associated with one or more habit trigger indicators have been satisfied. As described herein, the conditions of one or more of the habit trigger indicators may be based on other data besides user activity data. In some implementations, habit information system 140 may provide information influenced by the user habit only when all of the conditions associated with all of the habit trigger indicators of the user habit have been satisfied. In some implementations, the habit information system 140 may provide information influenced by the user habit when the conditions associated with less than all of the habit trigger indicators have been satisfied.

As described herein, one or more habit indicators may optionally be tied to one another. Also, as described herein, one or more habit indicators may include one or more conditions that are based on data besides user activity data. For example, the habit trigger indicator of "Weekday" may identify a condition of it being a week day and the habit trigger indicator of "Between 11:00 A.M. and 1:00 P.M." may identify a condition related to it being between the hours of 11:00 A.M. and 1:00 P.M.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to perform one or more of the steps of FIG. 4 and/or FIG. 5.

These software modules are generally executed by processor 814 alone or in combination with other processors. Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 828 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:

identifying a plurality of past activity occurrences, of a user, that are each based on prior user input at a given application of a computing device of the user, wherein the given application is a calling application;

determining a group of the past activity occurrences based on the past activity occurrences of the group each defining a particular interaction entity interacted with during the past activity occurrence, wherein the group of past activity occurrences are associated with a user action of calling the particular interaction entity using the calling application;

determining a habit interaction entity that conforms to the particular interaction entity of the past activity occurrences of the group;

determining a temporal habit trigger indicator based on temporal features of the past activity occurrences of the group, wherein the temporal habit trigger indicator defines one or more times of day and/or one or more days of the week associated with the user action of calling the particular interaction entity;

associating a user habit with the user, the user habit including the habit interaction entity and the temporal habit trigger indicator;

subsequent to associating the user habit with the user:
  determining that a current temporal indicator conforms to the temporal habit trigger indicator; and
  based on determining that the current temporal indicator conforms to the temporal habit trigger indicator:
    automatically causing a recommendation to be presented at the computing device or an additional computing device of the user, wherein the recommendation is based on the habit interaction entity of the user habit and includes a selectable element that, when selected, causes performance, via the computing device or the additional computing device, of an action directed to the habit interaction entity,
      wherein the selectable element, when selected, automatically dials a phone number for the habit interaction entity in the calling application via the computing device or the additional computing device.

2. The method of claim 1, wherein the temporal habit trigger indicator defines both one or more times of day and one or more days of the week.

3. The method of claim 1, wherein causing the recommendation to be presented comprises causing the recommendation to be promoted, relative to one or more other recommendations, based on determining that the current temporal indicator conforms to the temporal habit trigger indicator.

4. The method of claim 1, further comprising:
  ranking the recommendation, relative to one or more other recommendations, based on determining that the past activity occurrences are indicative of one or more of the temporal habit trigger indicators;
  wherein providing the recommendation comprises providing the recommendation based on the ranking.

5. The method of claim 1, further comprising:
  determining a location habit trigger indicator based on location features of the occurrences of the past activity occurrences of the group;
  wherein the user habit further includes the location habit trigger indicator; and
  wherein automatically causing the recommendation to be presented is further based on determining that a current location, of the computing device or the additional computing device, conforms to the location habit trigger indicator.

6. A computing device, comprising:
  a display;
  memory storing instructions; and
  one or more processors operable to execute the instructions stored in the memory, comprising instructions to:
    identify a plurality of past activity occurrences, of a user, that are each based on prior user input at a given application of the computing device, wherein the given application is a text messaging application;
    determine a group of the past activity occurrences based on the past activity occurrences of the group each defining a particular interaction entity interacted with during the past activity occurrence, wherein the group of past activity occurrences are associated with a user action of text messaging the particular interaction entity using the text messaging application;
    determine a habit interaction entity that conforms to the particular interaction entity of the past activity occurrences of the group;
    determine a temporal habit trigger indicator based on temporal features of the past activity occurrences of the group, wherein the temporal habit trigger indicator defines one or more times of day and/or one or more days of the week associated with the user action of text messaging the particular interaction entity;
    associate a user habit with the user, the user habit including the habit interaction entity and the temporal habit trigger indicator;
    subsequent to associating the user habit with the user:
      determine that a current temporal indicator conforms to the temporal habit trigger indicator; and
      based on determining that the current temporal indicator conforms to the temporal habit trigger indicator:
        automatically present a recommendation at the display of the computing device, wherein the recommendation is based on the habit interaction entity of the user habit and includes a selectable element that, when selected, causes performance, via the computing device, of an action directed to the habit interaction entity,
          wherein the selectable element, when selected, causes the computing device to automatically populate a phone number for the habit interaction entity in a text messaging application of the computing device.

7. The computing device of claim 6, wherein the temporal habit trigger indicator defines both one or more times of day and one or more days of the week.

8. The computing device of claim 6, wherein the instructions to automatically present the recommendation comprise instructions to promote the recommendation, in the presentation and relative to one or more other presented recommendations, based on determining that the current temporal indicator conforms to the temporal habit trigger indicator.

9. The computing device of claim 6, wherein the instructions further comprise instructions to:
  rank the recommendation, relative to one or more other recommendations, based on determining that the past activity occurrences are indicative of one or more of the temporal habit trigger indicators;
  wherein the instructions to present the recommendation comprise instructions to present the recommendation based on the ranking.

10. The computing device of claim 6, wherein the instructions further comprise instructions to:
  determine a location habit trigger indicator based on location features of the occurrences of the past activity occurrences of the group;
  wherein the user habit further includes the location habit trigger indicator; and
  wherein the instructions to automatically present the recommendation comprise instructions to automatically present the recommendation based on determining that a current location, of the computing device, conforms to the location habit trigger indicator.

11. A system, comprising:
  a display;
  memory storing instructions; and
  one or more processors executing the instructions, stored in the memory, to:
    identify a plurality of past activity occurrences, of a user, that are each based on prior user input at a given application of a computing device of the user, wherein the given application is a calling application;

determine a group of the past activity occurrences based on the past activity occurrences of the group each defining a particular interaction entity interacted with during the past activity occurrence, wherein the group of past activity occurrences are associated with a user action of calling the particular interaction entity using the calling application;

determine a habit interaction entity that conforms to the particular interaction entity of the past activity occurrences of the group;

determine a temporal habit trigger indicator based on temporal features of the past activity occurrences of the group, wherein the temporal habit trigger indicator defines one or more times of day and/or one or more days of the week associated with the user action of calling the particular interaction entity;

associate a user habit with the user, the user habit including the habit interaction entity and the temporal habit trigger indicator;

subsequent to associating the user habit with the user:
  determine that a current temporal indicator conforms to the temporal habit trigger indicator; and
  based on determining that the current temporal indicator conforms to the temporal habit trigger indicator:
    automatically cause a recommendation to be presented at the computing device or an additional computing device of the user, wherein the recommendation is based on the habit interaction entity of the user habit and includes a selectable element that, when selected, causes performance, via the computing device or the additional computing device, of an action directed to the habit interaction entity,
    wherein the selectable element, when selected, automatically dials a phone number for the habit interaction entity in a calling application via the computing device or the additional computing device.

\* \* \* \* \*